United States Patent [19]

Anders et al.

[11] 4,127,373
[45] Nov. 28, 1978

[54] EXTRUDER AND TWIN ROLLER CALENDERING PLANT

[75] Inventors: Dietmar Anders; Wilhelm Brand, both of Hannover; Manfred Dienst, Burgdorf, all of Fed. Rep. of Germany

[73] Assignee: Hermann Berstorff Maschinenbau GmbH, Hannover, Fed. Rep. of Germany

[21] Appl. No.: 804,453

[22] Filed: Jun. 7, 1977

[30] Foreign Application Priority Data

Jun. 9, 1976 [DE] Fed. Rep. of Germany ....... 2625737

[51] Int. Cl.$^2$ ............................................. B29F 3/012
[52] U.S. Cl. ................................ 425/192 R; 425/194; 425/327; 425/380; 425/DIG. 116
[58] Field of Search ............... 425/363, 325, 366, 328, 425/327, 367, 194, 376, 380, 190, 191, 192, 188, DIG. 116; 264/176 R

[56] References Cited

U.S. PATENT DOCUMENTS

| | | | |
|---|---|---|---|
| 375,168 | 12/1887 | Langles | 425/190 X |
| 790,918 | 5/1905 | Du Pont | 425/325 |
| 954,937 | 4/1910 | Day et al. | 425/367 X |
| 1,506,037 | 8/1924 | Willmouth | 425/190 X |
| 1,519,569 | 12/1924 | Vicars | 425/367 |
| 3,895,898 | 7/1975 | Theysohn | 425/325 |
| 3,902,835 | 9/1975 | Theysohn | 425/380 X |

*Primary Examiner*—Robert L. Spicer, Jr.
*Attorney, Agent, or Firm*—Donald D. Jeffery

[57] ABSTRACT

Extruder and twin roller calendering plant for producing films or sheets of synthetic plastics or rubber material comprising a pair of calendering rollers mounted in a calender frame and an extruder nozzle head directed into the gap between the pair of calendering rollers, the calender frame being pivotally mounted such that it can be pivoted away from the extruder nozzle head to allow ready access to the extruder nozzle head. The calender frame may be pivotally mounted on the nozzle head and a counter balance weight and/or the drive motor for rollers can be mounted on an opposite side of the pivot to the rollers thereby to counter balance the weight of the rollers.

5 Claims, 2 Drawing Figures

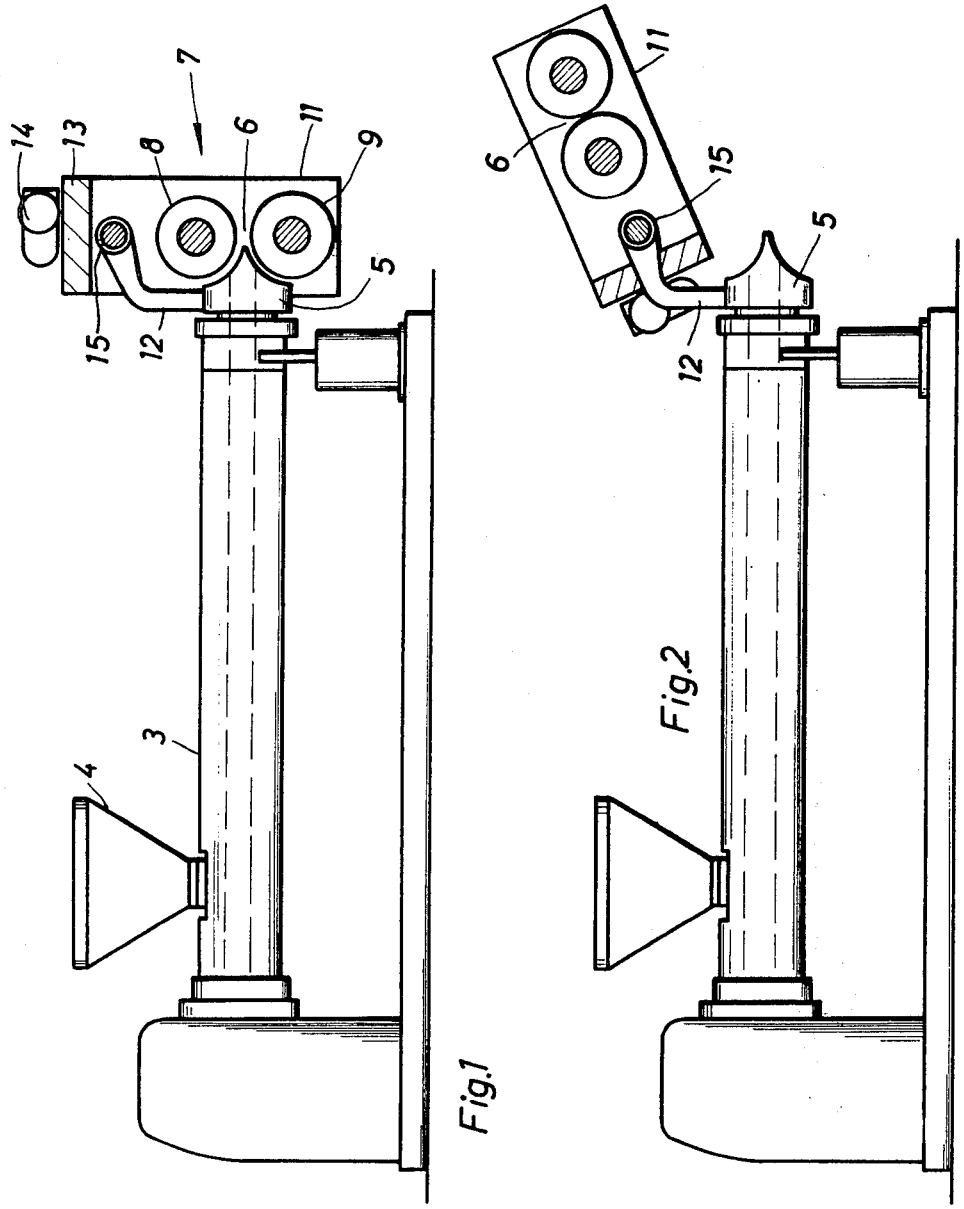

EXTRUDER AND TWIN ROLLER CALENDERING PLANT

The invention relates to an extruding and twin roller calendering plant for producing films or sheets of synthetic plastics or rubber material having a pair of calendering rollers mounted in a calender frame and an extruder nozzle directed into the gap between the pair of calendering rollers.

In such an extruding and twin roller calendering plant, the extruder plasticises the material being processed and then delivers the composition, prepared according to the material concerned, into the extruder nozzle head, from which the composition is extruded at the delivery pressure and fed to the twin roller calender downstream of it, by which the composition is calendered in the form of a broad strip of a desired thickness. This strip can then be used, for example, to feed a multi-roll calender.

When a production run is finished or if it is desired to process a material of a different composition, feed of material to the extruder is ceased and the extruder continues to run until it is empty. The extruder screw however cannot clear the previously used material from the nozzle head and the material remaining in the nozzle head has to be removed before a fresh run can be commenced. For this it is necessary for the operator to have unhindered access to the nozzle head and to allow this, it has been suggested that the extruder or the twin roller calender be made mobile. However, this has the disadvantage of being technically complicated and the space requirement is correspondingly great.

The invention is based on the problem of providing extruding and twin roller calendering plant in which the operator can easily and quickly gain access to the nozzle head of the extruder for the purpose of cleaning it.

According to the invention, there is provided extruding and twin roller calendering plant for producing films or sheets of synthetic plastics or rubber material comprising a pair of calendering rollers mounted in a calender frame and an extruder nozzle head directed into the gap between the pair of calendering rollers, the calender frame being pivotally mounted such that it can be pivoted away from the extruder nozzle head to allow ready access to the extruder nozzle head.

When there is a production change, the calender frame is pivoted away from the nozzle head. The operater can gain easy access to the nozzle head. A further substantial advantage resides in the fact that after pivoting of the calender, the extruder screw can easily be changed.

The calender frame can be pivotally mounted on the nozzle head.

Advantageously a weight is disposed on the calender frame on an opposite side of the pivot to the rollers to counter balance at least a part of the weight of the rollers. This makes it possible for the operator easily to pivot the calendering rollers away from the nozzle head.

A drive motor of the rollers can be mounted on the calender frame on an opposite side of the pivot to the rollers to counter balance at least a part of the weight of the rollers.

The invention is diagrammatically illustrated by way of example in the accompanying drawing, in which FIG. 1 is a part sectional elevation of extruding and twin roller calendering plant according to the invention in the position of use; and FIG. 2 is a view corresponding to FIG. 1 but with the twin roller calendering plant pivoted with respect to the extruder to allow access to the extruder nozzle head.

Referring to the drawing, an extruder 3 has a filling hopper 4 into which plastics material can be fed to be plasticised and blended in the extruder 3 by means of an extruder screw thereof (not shown). The worked material is extruded in the form of a broad strip from a broad-slit nozzle 5 and is fed into the roller gap 6 of a twin roller calender 7. Rollers 8, 9 of the twin roller calender 7 are mounted in a calender frame 11. An arm 12 is rigidly connected to the nozzle head of the broad slot nozzle 5 and mounts the calender frame 11 for rotation about a pivot 15. To counter balance the weight of the rollers and allow the operator more easily to pivot the calender frame about the pivot 15, the calender frame 11 includes a compensating weight 13 and also the drive motor 14 for the rollers 8, 9 mounted above the pivot 15.

With the calender frame 11 pivoted about the pivot point 15 on the arm 12, as shown in FIG. 2, the broad slot nozzle 5 and the roller gap 6 are easily accessible for cleaning.

What is claimed is:

1. In an extruding and twin roller calendering plant formed with an extruder nozzle head for producing films of elastomeric material, the invention comprising:
    (a) a separate calender frame;
    (b) a pair of calendering rollers mounted on said frame, said rollers being spaced to form a gap into which is directed said nozzle head when said frame is in a calendering position;
    (c) means for pivotally mounting said frame for movement between said calendering position and a second position away from said nozzle head to allow ready access to said nozzle head, and
    (d) a compensating weight on said calender frame on an opposite side of said pivotal mounting to said rollers to counter balance the weight of said rollers.

2. The invention of claim 1 wherein said means for pivotally mounting said frame comprises an arm secured at one end to said nozzle head and carrying at its other end a pivot on which said frame is mounted for swinging movement, said pivot being disposed above said rollers.

3. The invention of claim 1 further comprising drive motor means for said rollers mounted on said calender frame on an opposite side of said pivotal mounting to said rollers to counter balance the weight of said rollers.

4. The invention of claim 1 wherein said means for pivotally mounting said frame comprises an arm secured at one end to said nozzle head and carrying at its other end a pivot on which said frame is mounted for swinging movement, said pivot being disposed above said rollers.

5. The invention of claim 1 wherein said means for pivotally mounting said frame comprises an arm secured at one end of said nozzle head and carrying at its other end a pivot on which said frame is mounted for swinging movement, said pivot being disposed above said rollers, and drive means for said rollers mounted on said calender frame on an opposite side of pivot to said rollers to counter balance the weight of said rollers.

* * * * *